United States Patent [19]

Hwang

[11] 4,312,755
[45] Jan. 26, 1982

[54] REVERSE OSMOSIS SYSTEM
[75] Inventor: Sun-Tak Hwang, Iowa City, Iowa
[73] Assignee: Dow Corning Corporation, Midland, Mich.
[21] Appl. No.: 53,587
[22] Filed: Jun. 29, 1979
[51] Int. Cl.³ .............................................. B01D 31/00
[52] U.S. Cl. .............................. 210/321.1; 210/416.1; 210/433.2; 210/456
[58] Field of Search ................... 210/22, 23 H, 321 R, 210/23 F, 416 R, 433 M, 195 S, 456; 55/16, 158

[56] References Cited
U.S. PATENT DOCUMENTS

| | | | |
|---|---|---|---|
| 2,930,754 | 3/1960 | Stuckey | 210/23 H |
| 3,144,313 | 8/1964 | Pfefferle | 55/16 |
| 3,228,877 | 1/1966 | Mahon | 210/22 |
| 3,276,997 | 10/1966 | Reid | 210/23 H |
| 3,563,860 | 2/1971 | Henderyicky | 210/23 H |
| 3,799,873 | 3/1974 | Brown | 210/23 H |
| 3,825,493 | 7/1974 | Brown et al. | 210/23 H |
| 3,836,457 | 9/1974 | Gross et al. | 210/23 H |
| 4,105,547 | 8/1978 | Sandblom | 210/23 F X |

Primary Examiner—Frank A. Spear, Jr.
Attorney, Agent, or Firm—Max J. Kenemore

[57] ABSTRACT

The relative concentrations of solvent and solute in a solution are altered by a system which includes a cell having chambers separated by a membrane and a means for creating a pressure differential across the membrane. A solution moves through an inlet means around the system and countercurrent and reflux flow and outlet means. The cell may be formed of modular units in such a way as to effect a tapered configuration so that the flow rate is homogeneous around the system.

11 Claims, 5 Drawing Figures

REVERSE OSMOSIS SYSTEM

BACKGROUND OF THE INVENTION

1. Field of the Invention

This invention relates generally to the field of reverse osmosis by the passage of solutes across a membrane, and more specifically, to altering the relative concentrations of solvent to solute in a solution.

2. Description of the Prior Art

Reverse osmosis is not new. In its simplest terms, it is the passage of a solvent from a solution which is under pressure across a semi-permeable membrane which tends to block the solute.

The most common applications of reverse osmosis are in areas such as sea water desalination and blood purification (artificial kidney machine). Efforts to improve such applications have generally been directed to finding membranes which totally block a particular solute or to cascading systems which compensate for the failure of a membrane to totally block a solute.

The use of countercurrent flow in reverse osmosis devices and cascading is evidenced in, for example, U.S. Pat. Nos. 3,799,873, 2,930,754 and 3,276,997.

Efforts to find such an ideal membrane have not been greatly successful. Reverse osmosis devices which use currently available membranes and cascading systems often require undesirably high pressures and numerous cascading steps to obtain acceptably high concentrations of solvent.

A system for altering the concentration of solvent to solute in a solution which avoids the necessity of extremely high pressures and multiple cascading steps is desirable. Such a system which avoids the need for a membrane capable of totally blocking the solute is also desirable.

SUMMARY OF THE INVENTION

It is a principal object of this invention to alter the concentration of solute in a solvent.

It is another object of this invention to alter the relative concentrations of solute to solvent at convenient temperatures and pressures.

It is also an object of this invention to reduce the salt concentration in sea water.

It is still another object of the present invention to overcome the disadvantages of the prior art.

These and other objects are accomplished by a system operable at room temperature for altering the relative concentrations of solute to solvent in a solution. The system includes at least one cell having chambers separated by a semi-permeable membrane. The chambers communicate in such a way as to produce countercurrent reflux flow of the solution and to result in one chamber having a higher pressure than the other. The chambers have a geometry which avoids backmixing.

The system also includes a means for creating a pressure differential across the membrane and at least one inlet means for feeding the mixture into the system. At least one outlet means is also included in the system for recovering the solution after the relative concentrations of solute and solvent have been altered.

The means for creating a pressure differential between the chambers may be a pressure reducer positioned in the communication between the chambers. It may also be a relatively high pressure feed mixture or a compressor which communicates between the chambers or both.

The outlet means may be positioned in the system to recover a solution which has a high or low concentration of solute, or both. The inlet means can be positioned at any suitable location in the system, but it is preferably located at a point where the concentration of solvent and solute matches the concentration of solvent and solute in the inlet mixture.

Any suitable semi-permeable membrane material may be used. Representative useful materials include cellulose acetate, cellulose ester, ethyl cellulose, polyacrylonitrile representatives, polyamides, and the like. Generally, tougher, longer lasting and less efficient membranes can be used in the present invention while still obtaining good solvent concentration. Because of the continual sweeping action of the countercurrent reflux flow of the solution, the membrane surface is continually cleaned. High salt concentrations are not pressured against the membrane as in ordinary systems.

The cell may be formed from a plurality of interconnected modular units. Each such unit includes chambers separated by a membrane. In the preferred embodiment, the modular units are interconnected in a tapered configuration so as to form a system in which the rate of movement of the solution is substantially constant throughout the system.

DETAILED DESCRIPTION

Figure 1:
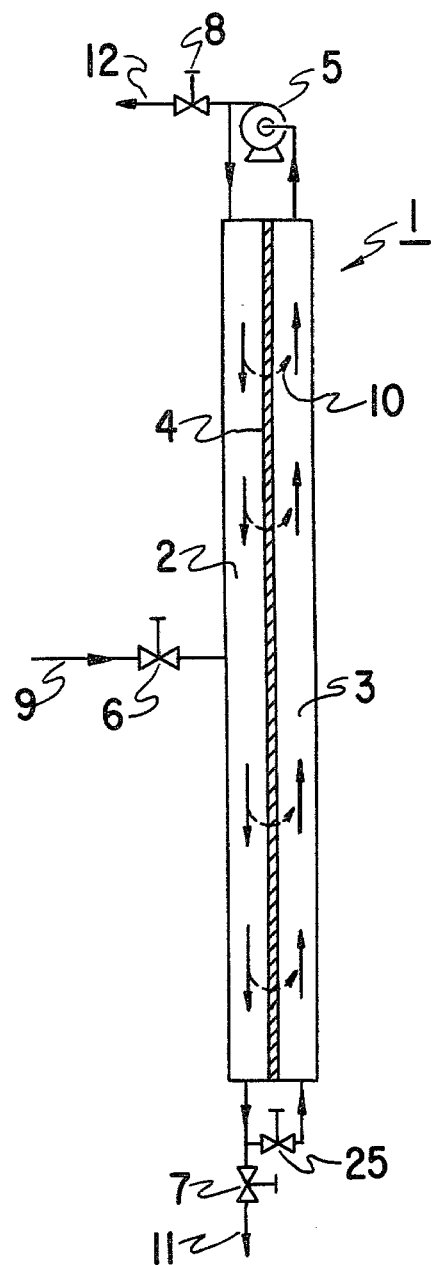
FIG. 1 shows schematically and in cross-section a system according to the present invention.

Referring more specifically to FIG. 1, there is shown a system according to this invention for altering the relative concentrations of solvent and solute in a solution moving in the system. The system includes cell 1 which has a high pressure chamber 2 and a low pressure chamber 3 separated by a membrane 4. Chambers 2 and 3 communicate through pressure reducer 25 and compressor 5.

Each chamber 2 and 3 has a geometry which avoids backmixing of solution flowing through the system. Such a geometric requirement usually results in the chambers having a small cross-section. In a representative embodiment, for example, cell 1 is a bundle of hollow microfibers packed in a tube, each hollow microfiber having an I.D. of 0.0094 inch (0.239 mm) and an O.D. of 0.024 inch (0.610 mm). The inside of the microfibers forms chamber 2 and the area outside the fibers but inside the tube forms chamber 3.

An inlet means 6 allows entry of a solution into the system. Inlet means 6 may be a pressurized feed. The pressurized feed creates a pressure differential across the membrane with the aid of pressure reducer 25. Inlet means 6 can be located anywhere along either side of cell 1, but it is most preferably located at about the point where the concentration of solvent to solute in the solution moving through the system is about the same as the concentration of solvent and solute entering the system.

In the embodiment of FIG. 1, the pressure differential across the membrane can be provided by compressor 5 which increases the solution pressure as it moves from chamber 3 to chamber 2.

Outlet 7 for altered solution 11 enriched in solute is located at one end of the system. Outlet 8 is provided at the other end of the system to collect altered solution 12 enriched in solvent.

A plurality of outlets such as outlets 7 and 8, or one such outlet could be placed anywhere along either side of the cell to collect any desired mixture of solvent and solute.

In operation of the embodiment of FIG. 1, a pressurized feed solution 9 enters the system at inlet 6 and moves around the system in the direction shown by the arrows.

Amounts of solvent 10 pass through membrane 4 as solution 9 moves along chamber 2. As solution 9 approaches the end of chamber 2, its relative concentrations of solute and solvent 10 has changed because of the loss of solvent 10.

Altered solution 11 which has a relatively low concentration of solvent 10 may be recovered at outlet 7.

As solution 9 moves along chamber 3, countercurrent to its flow in chamber 2, it gathers additional amounts of solvent 10 so that an altered solution 12 containing a relatively high ratio of solvent 10 may be collected at outlet 8.

In most operations, the flow rate of the recirculated solution through cell 1 may exceed considerably that of feed solution 9; however, at steady state operation, the flow rate of altered solutions 11 and 12 will total the flow rate of feed solution 9.

Figure 2:
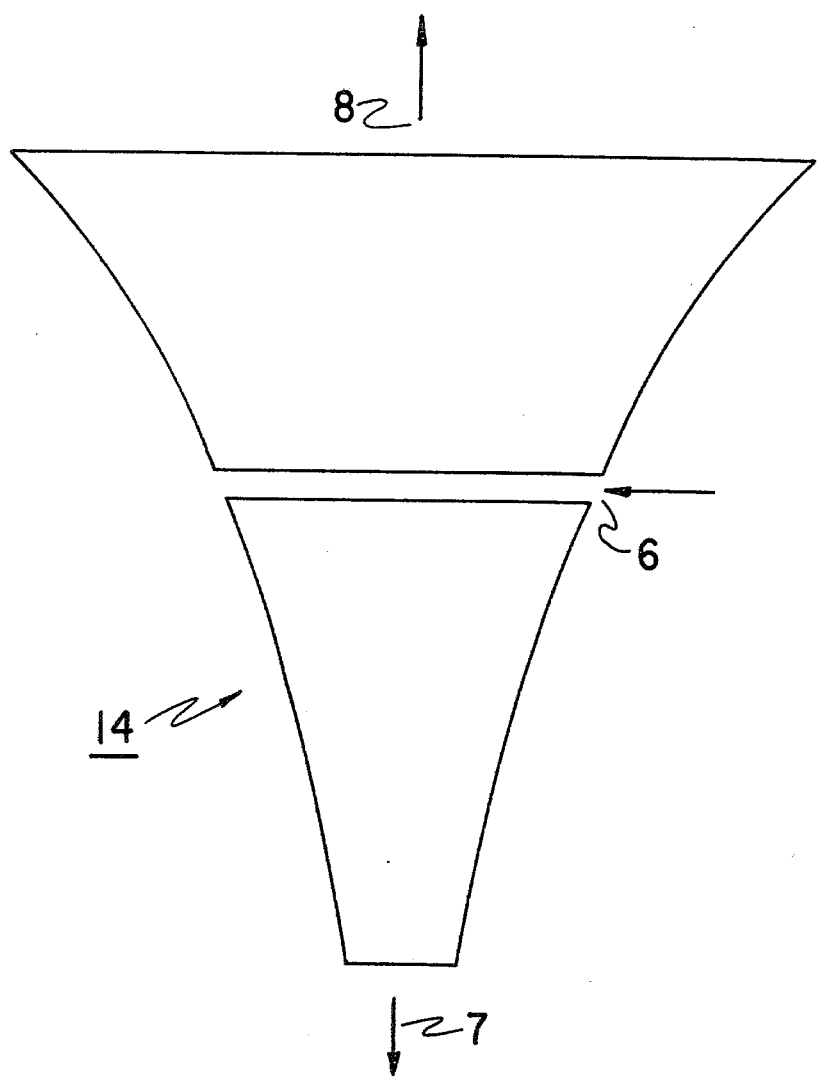
FIG. 2 shows schematically the relative membrane area required to obtain substantially even flow in the system of FIG. 1.

It can readily be seen that such a flow pattern would normally result in a greater volume of solution 9 being present near the compressor end of cell 1 where solvent 10 tends to accumulate. FIG. 2 shows schematically a sheet membrane 14 which is shaped to correspond with the changing volume of flow of solution 9 as it circulates around cell 1 of FIG. 1 in countercurrent fashion so that there is a homogeneous rate of flow. As solution 9 enters chamber 2 at inlet 6, much of solvent 10 passes through membrane 4 and adds to the volume of the portion of solution 9 which is already in chamber 3. The volume of solution 9 is continually reduced as it passes along chamber 2 because of the continual passage of portions of solution 10 through membrane 4.

Sheet membrane 14 of FIG. 2 is constructed to correspond with the changes in volume of solution 9 so as to result in a substantially uniform flow of solution 9.

A system according to the present invention can be constructed to correspond to the shape of sheet membrane 14, with an outlet for altered solution 11 enriched with the least permeable product and outlet 8 for altered solution 12 enriched with the most permeable product.

However, the construction of such a system presents practical construction difficulties which do not make it a preferred embodiment. Such difficulties are largely overcome by the representative embodiment shown schematically in FIG. 3.

Cell 15 is constructed of modular units 16. Each unit 16 comprises a high pressure chamber 17 and a low pressure chamber 18 separated by a membrane 19. Units 16 are interconnected in such a way as to result in a membrane surface area and configuration approximating that shown in FIG. 2 so that the rate of flow is substantially constant at all parts of cell 15.

Figure 3:
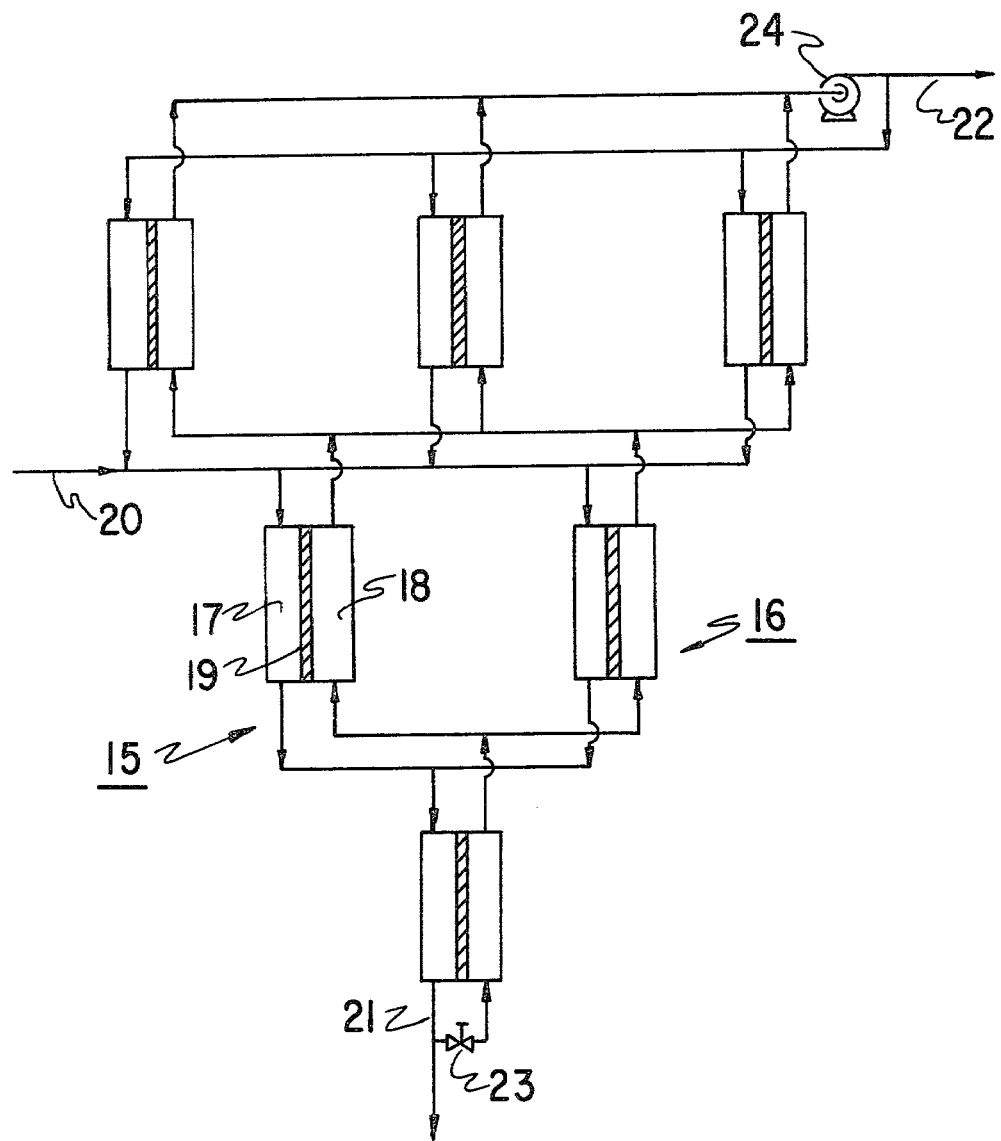
FIG. 3 shows schematically and in cross-section an arrangement of modular units which together form the system of claim 1 having a membrane area approximating that shown in FIG. 2.

In cell 15 a solution is introduced at inlet 20. It moves through chambers 17 and 18 and through membrane 19 as in FIG. 1. In the embodiment of FIG. 3 the solution moves at a substantially uniform rate throughout the system because of the tapered configuration of modular units 16. A solution having an altered concentration of solute and solvent can be removed at outlet 21 (for mixtures having a reduced concentration of solvent) or at outlet 22 (for mixtures having an increased concentration of solvent).

Pressure reducer 23 and compressor 24 function as pressure reducer 25 and compressor 5 of FIG. 1.

Figure 4:
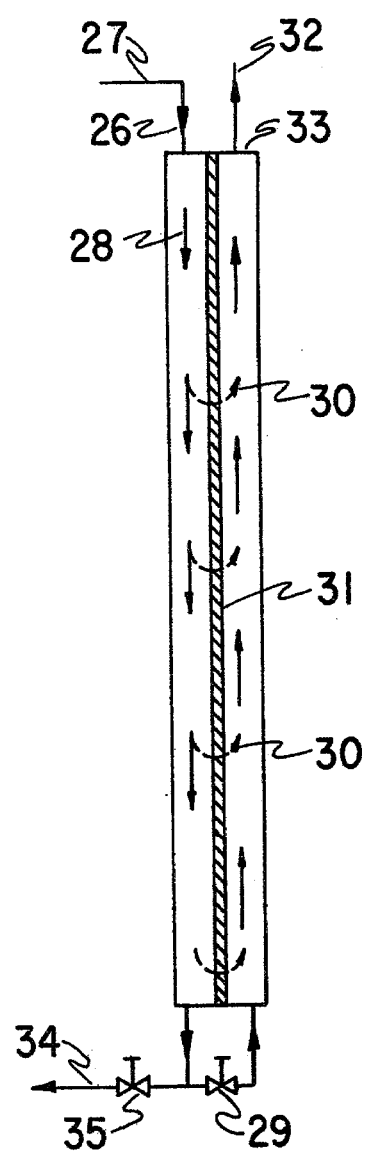
FIGS. 4 and 5 show alternative embodiments of the system of the present invention.

FIG. 4 shows schematically and in cross-section an embodiment of the present invention wherein the pressure differential is accomplished by a pressurized feed of solution 27 through inlet 26, as solution 27 moves through high pressure chamber 28 to pressure reducer 29, solvent 30 moves through semi-permeable membrane 31. In low pressure chamber 32 solvent 30 joins mixture 27 in countercurrent reflux flow.

An altered solution 32 having a high concentration of solvent can be collected at outlet 33. However, in this embodiment it is most usually desirable to collect altered solution 34 at outlet 35. Altered solution 34 has been stripped of some of its solvent 30, leaving it with an enriched concentration of solute.

Figure 5:
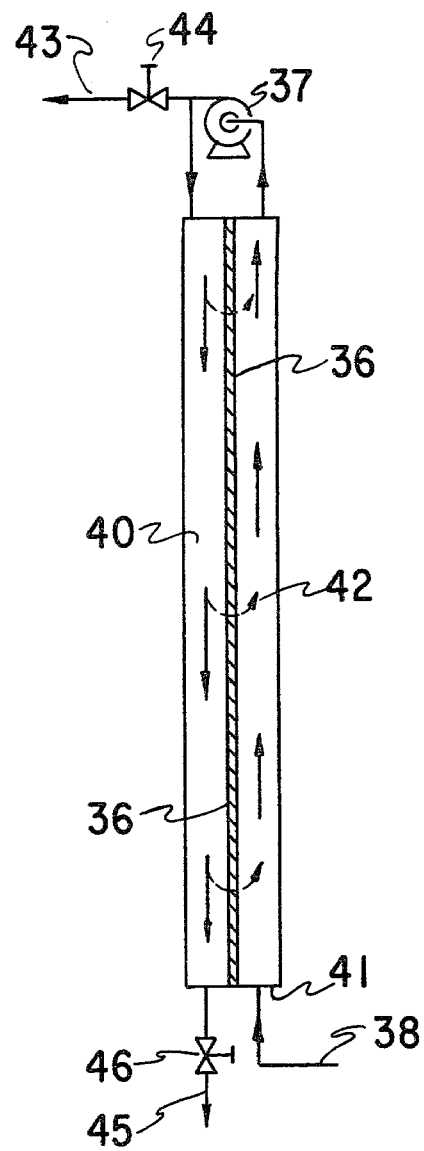

Referring more specifically to FIG. 5, there is shown yet another embodiment of the present invention. The pressure differential across membrane 36 is accomplished by pump 37 which draws feed solution 38 (such as sea water) into low pressure chamber 39 at inlet 41, increases its pressure and moves it into high pressure chamber 40 in countercurrent flow. Solvent 42 of solution 38 moves through membrane 36 in the direction shown by the arrows and countercurrent flow of solution 38 results in an altered solution 43 which is enriched in solvent 42 (water). Altered solution 43 may be collected at outlet 44. An altered solution 45, which is usually considered as residue in this embodiment may be collected at outlet 46.

The present invention has been disclosed in the above teachings and drawings with sufficient clarity and conciseness to enable one skilled in the art to make and use the invention, to know the best mode for carrying out the invention and to distinguish it from other inventions and from what is old. Many variations and obvious adaptations of the inventions will readily come to mind, and these are intended to be contained within the scope of the invention as claimed below.

That which is claimed is:

1. A system for altering the relative concentration of solute to solvent in a solution, the system comprising a plurality of interconnected units wherein each unit comprises
  (a) a cell having chambers separated by a semi-permeable membrane, the membrane having a different permeability constant for the solute and the solvent, the chambers each having a sufficiently small cross section to direct the movement of the solution in substantially non-turbulent flow across the face of the membrane;
  (b) means for conducting the solution which has passed through one chamber into the other chamber and for directing the solution so that it moves in opposite directions on either side of the membrane;

(c) means for creating a pressure differential across the membrane;

(d) at least one inlet means for feeding the solution into the system;

(e) at least one outlet means for recovering the solution from the system after the relative concentrations of solute and solvent have been altered;

characterized in that the units are interconnected to form a configuration which is tapered in such a way that the linear velocity of the solvent is substantially constant throughout the system.

2. The system of claim 1 wherein the communication between the chambers includes a pressure reducing means.

3. The system of claim 1 wherein the means for creating a pressure differential provides a relatively high pressure feed solution.

4. The system of claim 1 wherein the means for creating a pressure differential is a pump which communicates between the chambers.

5. The system of claim 1 wherein an outlet means is positioned to recover the mixture at a location in the cell where the solution has a relatively high concentration of solvent.

6. The system of claim 1 wherein an outlet means is positioned to recover the mixture at a location in the cell where the solvent has a relatively high concentration of solute.

7. The system of claim 1 wherein a plurality of outlet means are positioned to recover solutions having a plurality of concentrations of solute.

8. The system of claim 1 wherein at least one inlet means is positioned at a location on the cell at which the solution in the cell has approximately the same relative concentration of solvent and solute as the solution fed by the inlet means.

9. The system of claim 1 wherein the membrane is selected from the group comprising cellulosic materials and polyamides.

10. The system of claim 1 wherein the membrane is cellulose acetate.

11. The system of claim 1 wherein the membrane is a hollow fiber.

* * * * *